April 27, 1965

J. O. LENZ 3,180,009

METHOD OF FABRICATING A COMPOSITE
ELECTRICAL TERMINAL ASSEMBLY
Filed Feb. 27, 1964

INVENTOR.
JOHN O. LENZ

BY *Robert S. Craig*

ATTORNEY

United States Patent Office 3,180,009
Patented Apr. 27, 1965

3,180,009
METHOD OF FABRICATING A COMPOSITE
ELECTRICAL TERMINAL ASSEMBLY
John O. Lenz, Coon Rapids, Minn., assignor to
Honeywell Inc., a corporation of Delaware
Filed Feb. 27, 1964, Ser. No. 347,953
4 Claims. (Cl. 29—155.55)

This application is a continuation-in-part of application Serial Number 862,176, filed December 28, 1959, now abandoned, and is assigned to the same assignee.

This invention relates to a method of fabricating a composite metal and plastic panel having utility in providing mechanical support as well as electrical insulation for a variety of components.

It is known to provide composite panels with an insert having desired mechanical or electrical properties differing from the remainder of the panel, but such inserts have been retained in place by some fastening means. The present invention provides a composite panel in which a plastic insert is retained in a sheet metal panel solely by an interference fit between the plastic and the metal. In order to attain the necessary accurate sizing of the two cooperating parts in an economically feasible way, the plastic is cut by the edge of the metal sheet that is to support the plastic in the finished product. In this shearing operation there is some resilient expansion of the metal and compression of the plastic insert that is available to hold the insert in the panel. Also, in the case of fiber filled plastic sheets, there is some tearing of the fibers out of the two separated edges so that many fibers remain extending slightly beyond the sheared edges. If the plastic sheet is thicker than the metal sheet and extends beyond both surfaces thereof, these protruding fibers are instrumental in holding the plastic insert in place.

Figure 3:
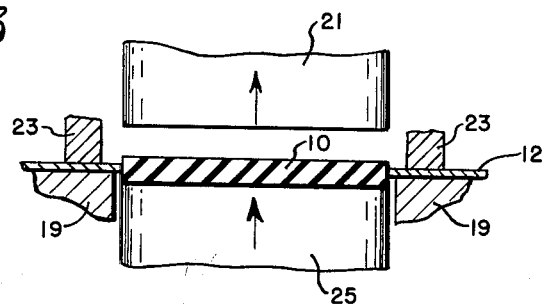
FIGURE 3 shows the metal insert in its final position in the metal sheet.
Figure 4:
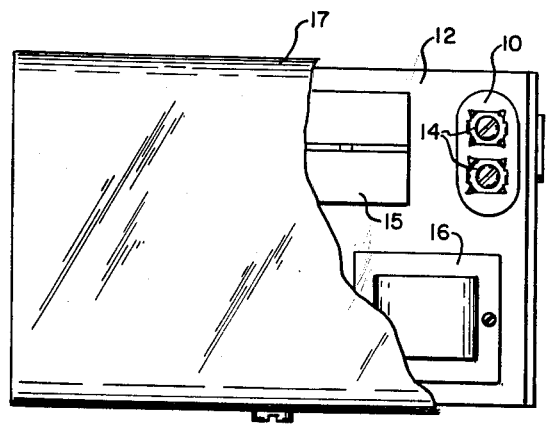
FIGURE 4 shows a composite metal and plastic panel incorporated in an electrical control panel.

A composite sheet metal and sheet plastic panel is shown in section in FIGURE 3, while FIGURE 4 shows such a panel carrying a pair of electrical terminals as well as other components of a control device. An insert 10 formed from a sheet of glass fiber filled plastic is disposed in an opening in a steel sheet 12 and is supported thereby. The plastic insert preferably is three to four times the thickness of the steel sheet and extends beyond the steel sheet on both sides thereof. The relative size of the plastic insert and opening in the steel sheet is such that an interference fit exists, so that a great amount of force would be required to dislodge the insert. In FIGURE 4 the insert 10 is seen to be of oval shape and carries a pair of electrical terminals 14. Other electrical components 15 and 16 are carried by the steel sheet 12. A cover 17 of the device is broken away in the drawing to show these parts.

As pointed out above, the interference fit between the steel and plastic sheets is attained by accurately forming the plastic insert so that some deformation of both sheets occurs when the plastic insert is forced into the steel sheet. When the plastic insert is formed by punching or shearing from a sheet of fiber filled plastic the edges thereof present a multitude of protruding fibers that extend beyond the sheared edge of the body or the plastic. These protruding fibers are instrumental in providing an interference fit in the steel sheet. Glass fiber filled laminated plastic has proved to be exceptionally effective in this respect. An insert of glass fiber laminated plastic of oval shape, one inch wide, two and one-half inches long and one-eighth inch thick, properly fitted in an opening in a sheet of .042 inch thick steel was found to require over six hundred pounds to dislodge. This force requirement was due solely to the interference fit between the cooperating steel and plastic edges as described above. The material of the insert so tested was of the type marketed by the Glastic Corporation under the designation Grade UMM, a thermosetting polyester glass laminate with random glass fiber orientation. This is a relatively rigid plastic.

While the desired interference fit obviously could be attained by forming the plastic insert in a separate operation, such procedure would require such accuracy as to rule it out as a practical production method. According to the present invention, the desired shape is punched from a steel sheet and the edges of the steel sheet used as a die to punch the plastic insert from a plastic sheet of somewhat greater lateral dimensions. This method eliminates problems of tolerance in the size of the opening in the steel sheet and sizes the plastic insert to provide the desired interference fit between the two materials.

Figure 1:
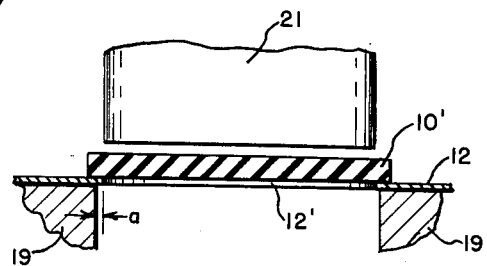
FIGURE 1 shows a plastic sheet overlying a metal sheet prior to punching.

FIGURE 1 shows the steel sheet 12 having an opening 12' formed therein of the desired shape. The sheet 12 is supported by a die block 19 having a similarly shaped opening therein. The opening in the die block may be slightly larger than the opening in steel sheet 12, as indicated by the dimension "a" on the drawing, so that the edge of the steel sheet extends beyond the supporting die block by as much as half the thickness of the steel sheet. A sheet strip 10' of plastic overlies the opening 12' in the steel sheet 12 and is supported thereby. A punch 21 has its edges suitably aligned with respect to the opening in the steel sheet. The punch 21 and die block 19 are incorporated as parts of a punch press in the usual manner.

Figure 2:
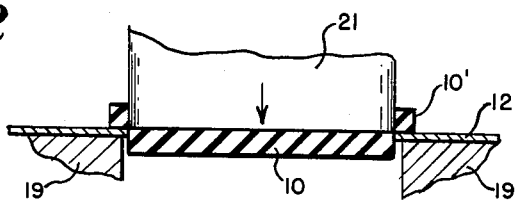
FIGURE 2 shows a portion of the plastic sheet of FIGURE 1 punched into the metal sheet.

The press is operated to move the punch 21 downwardly, as shown in FIGURE 2, to cut the insert 10 from the strip 10' and force it into the opening in the steel strip. The punch 21 is moved downwardly to the point where the top surface of the insert 10 is flush with the top surface of the steel sheet 12.

In the following step, as shown in FIGURE 3, the operation is completed by retracting the punch 21, restraining upward movement of the steel sheet 12 by means of a hold-down member 23, and bringing a push back pad 25 upwardly within the die block. Upward movement of the pad 25 is limited so that the plastic insert 10 will be finally located so that it extends beyond both the upper and lower surfaces of the steel sheet 12. Disposition and operation of the push back pad 25 in the punch press follows standard techniques so a detailed description is believed to be superfluous. Finally, the electrical terminal 14 is mounted on the insert so as to be supported by the panel but isolated electrically from the conducting portion thereof.

In some combinations of plastic material and thickness of sheet stock it is possible to eliminate the step of pushing the insert in reverse direction to center it with respect to the metal sheet. In this case the punch is lowered only to a point where the upper surface of the insert remains protruding above the metal sheet, but at which it has been effectively cut from the body of the plastic sheet. It is then possible to strip the unused part of the plastic sheet from the punched out portion without disturbing the insert in the metal sheet.

A composite metal and plastic panel of the described construction has the advantage over a larger all-plastic panel on which several parts are mounted in being less expensive and in having better heat dissipation. It also has the advantage over a small sub-panel held in a metal panel by some fastening means in that no space is required for the fastening means. While certain specific materials have been mentioned as being suitable for carrying out the described method, other materials obviously could be used, the only requirement being that the conducting material be capable of cutting the insulating material and that the insert will be retained in place.

I claim:

1. The method of applying an insulating support for an electrical terminal to a conducting panel comprising, forming an opening in a metal sheet, placing a sheet of insulating material on said metal sheet, said insulating sheet being of greater thickness than said metal sheet, punching the portion of said insulating sheet overlying the opening in said metal sheet into said metal sheet using the edges of said metal sheet as a die, said punching operation separating said portion of said insulating sheet from the remainder thereof and locating said insulating sheet portion so that it protrudes from said metal sheet on both sides thereof, and applying an electrical terminal to said insulating sheet portion so as to be electrically isolated from said metal sheet.

2. The method of mounting an electrical terminal on an insulating support on a conducting panel comprising, forming an opening in a metal sheet, placing a sheet of fiber filled plastic insulating material on said metal sheet, said insulating sheet being of greater thickness than said metal sheet, punching the portion of said insulating sheet overlying the opening in said metal sheet into said metal sheet using the edges of said metal sheet as a die, said punching operation causing some tearing of the fibers from the severed edges of said insulating sheet, said punching operation separating said portion of said insulating sheet from the remainder thereof and locating said insulating sheet portion so that it protrudes from said metal sheet on both sides thereof with fibers of said insulating sheet permitted to extend laterally beyond the edges of both surfaces of said metal sheet, and applying an electrical terminal to said insulating sheet portion so as to be electrically isolated from said metal sheet.

3. The method of applying an insulating support for an electrical terminal to a conducting panel comprising, forming an opening in a metal sheet, supporting the metal sheet on one side in an area encompassing the opening but spaced slightly therefrom, placing a sheet of insulating material on said metal sheet, said insulating sheet being of greater thickness than said metal sheet, punching the portion of said insulating sheet overlying the opening in said metal sheet into said metal sheet using the edges of said metal sheet as a die, said punching operation separating said portion of said insulating sheet from the remainder thereof and locating said insulating sheet portion so that it protrudes from said metal sheet on both sides thereof, and applying an electrical terminal to said insulating sheet portion so as to be electrically isolated from said metal sheet.

4. The method of mounting an electrical terminal on an insulating support on a conducting panel comprising, forming an opening in a metal sheet, supporting the metal sheet on one side in an area encompassing the opening but spaced slightly therefrom, placing a sheet of relatively rigid fiber filled plastic insulating material on said metal sheet, said insulating sheet being of greater thickness than said metal sheet, punching the portion of said metal sheet, punching the portion of said insulating sheet overlying the opening in said metal sheet into said metal sheet using the edges of said metal sheet as a die, said punching operation causing some tearing of the fibers from the severed edges of said insulating sheet, said punching operation separating said portion of said insulating sheet from the remainder thereof and locating said insulating sheet portion so that it protrudes from said metal sheet on both sides thereof with fibers of said insulating sheet permitted to extend laterally beyond the edges of both surfaces of said metal sheet, and applying an electrical terminal to said insulating sheet portion so as to be electrically isolated from said metal sheet.

References Cited by the Examiner
UNITED STATES PATENTS

| | | | |
|---|---|---|---|
| 1,128,532 | 2/15 | Schmidt | 29—432 |
| 2,456,118 | 12/48 | Foster | 29—155.55 X |
| 2,976,345 | 3/61 | Whitted. | |
| 2,995,617 | 8/61 | Maximoff et al. | |

WHITMORE A. WILTZ, *Primary Examiner.*

CHARLIE T. MOON, *Examiner.*